United States Patent [19]

Suzuki et al.

[11] Patent Number: 4,812,934
[45] Date of Patent: Mar. 14, 1989

[54] ACTUATOR FOR MEMORY STORAGE DEVICE

[75] Inventors: Masami Suzuki, Odawara; Hiroshi Nishida, Nakagun; Tomio Suzuki, Hiratuka; Katsumi Kawamura; Tsuyoshi Takahashi, both of Odawara, all of Japan

[73] Assignee: Hitachi, Ltd., Tokyo, Japan

[21] Appl. No.: 63,510

[22] Filed: Jun. 18, 1987

[30] Foreign Application Priority Data

Jul. 2, 1986 [JP] Japan .................. 61-154020

[51] Int. Cl.$^4$ .................. G11B 5/55; G11B 21/08
[52] U.S. Cl. .................. 360/106; 360/104; 310/13; 310/38
[58] Field of Search .................. 360/109, 106, 105, 104; 310/12, 13, 27, 36

[56] References Cited

U.S. PATENT DOCUMENTS 4,322,762  3/1982  Manzke et al. .................. 310/13 X
4,427,905  1/1984  Sutton .................. 310/13
4,490,635 12/1984  Harrison et al. .................. 360/106

FOREIGN PATENT DOCUMENTS 0087473  5/1985  Japan .................. 360/109

Primary Examiner—Stuart N. Hecker
Assistant Examiner—David J. Severin
Attorney, Agent, or Firm—Fay, Sharpe, Beall, Fagan, Minnich & McKee

[57] ABSTRACT

In a magnetic disc device, it is necessary that a magnetic head be positioned above an object data track at a high speed and with a high accuracy. This positioning operation is carried out by an actuator. In order to carry out a magnetic head-positioning operation at a high speed and with a high accuracy, it is necessary that a driving force generated by a magnetic circuit be applied to the center of gravity of the actuator. The techniques according to the present invention are characterized in that the center of gravity of the actuator and the position to which the driving force is applied are aligned with each other by regulating the distribution or position of the magnetic flux in the magnetic circuit.

9 Claims, 3 Drawing Sheets

ACTUATOR FOR MEMORY STORAGE DEVICE

BACKGROUND OF THE INVENTION

This invention relates to an actuator for a memory storage device, such as a magnetic disc device, and more particularly to an actuator which enables an accurate positioning operation to be carried out easily.

In a magnetic disc device, a magnetic head is positioned at a high speed and with a high accuracy above a data track on a magnetic disc, which is rotated at a high speed, and the reading/writing of the data is done with respect to the track. A structure for moving this magnetic head is called an actuator. The actuator consists generally of an actuator assembly supporting the magnetic head and guiding the same in a predetermined direction, and a driving unit.

A conventional magnetic disc device, in which, for example, a rectilinearly driving actuator is used, is constructed so that the center of the driving force of the actuator and the center of gravity of the magnetic head-supporting actuator assembly are aligned with the direction in which the actuator assembly advances. Owing to such an arrangement, the whole of the driving force is used effectively as the actuator assembly-driving force in the conventional magnetic disc device, so that a smooth high-speed positioning operation can be carried out. In the case where the center of gravity of the actuator assembly and the center of the driving force are not aligned with each other, a rotary force occurs around the center of gravity of the actuator assembly. In this case, a part of the driving force turns into rotary moment force, so that the actuator assembly cannot be driven effectively. Moreover, since vibrations occur in the direction which is other than the driving direction, they remain as residual vibrations even after the positioning has been done, so that the positioning accuracy decreases.

In a rotary actuator, the effective rotational force can be obtained when the center of the rotation and that of an impact of the actuator assembly agree with each other but vibrations occur in the translational direction when these centers do not agree with each other. In the latter case, the positioning accuracy also decreases. It is known that the position of the center of an impact is determined depending upon the positional relation between the center of gravity of the actuator assembly and the center of the driving force in such a case as well. Under the circumstances, aligning the center of gravity of the actuator assembly with the center of the driving force with each other is done regularly during the designing of an actuator as disclosed in, for example, U.S. Pat. No. 4,415,941.

In the above-described conventional example, the center of gravity of the actuator assembly and the center of the driving force are aligned on the basis of the geometric arrangement of the actuator assembly. However, these centers are not aligned perfectly in practice due to uncertain facters, such as the mounting tolerance of each member, scatter of mass thereof and influence of frictional force thereof. In this case, the rotary torque working around the center of gravity of the actuator assembly can be expressed by the formula F•Δr, wherein F is the driving force; and Δr the quantity of deviation, i.e., the rotary torque is proportional to the level of the driving force and the quantity of deviation.

In the magnetic disc devices developed in recent years, the level of the driving force continues to be increased in accordance with an increase in the rotational speed and accuracy thereof, while the level of a positioning error due to the residual vibration of the actuator assembly becomes unignorably high. Therefore, it is necessary that the center of gravity of the actuator assembly and the center of the driving force be aligned strictly with each other.

SUMMARY OF THE INVENTION

An object of the present invention is to provide a highly-accurate high-speed actuator for magnetic disc devices, which is capable of minimizing a deviation, which is ascribed to uncertain factors, such as the mounting tolerance, from the ideal positional relation between the center of gravity of the actuator assembly and the center of the driving force, and reducing the vibrations of the actuator, which are ascribed to the increased speed thereof, to a low level.

To achieve this object, it is necessary that the quantity of positional deviation or, which occurs due to the uncertain factors which differ in different magnetic disc devices, be minimized, and making adjustments after the assembling of the device is most effective for meeting the requirement. The quantity of positional deviation or represents the relation between the position of the center of gravity of the actuator assembly and that of the center of the driving force.

According to the present invention, either of these positions is set variable, and it is regulated after the device has been assembled, in the same manner as in the practical use of the device as the actuator assembly is driven, in such a manner that the vibrations occurring during this time become minimal.

DESCRIPTION OF THE PREFERRED EMBODIMENTS

First, the principle of the present invention will be described. The position of the center of gravity of an actuator assembly can be varied by adding regulating mass to the actuator assembly. Since an actuator is generally driven at a high speed, it is designed to have a small weight, so far as the strength of the material permits. Therefore, if the regulating mass is added to the actuator assembly, the acceleration performance thereof during an operation of the actuator assembly lowers. In view of this, it can be said that it is advantageous to set the position of the center of the driving force so that it is variable.

In a magnetic disc device, a voice coil motor consisting of a movable coil and a magnetic circuit is generally used as a driving means. In the voice coil motor, an electric current is applied to a movable coil which crosses a magnetic field generated by a magnetic circuit, to produce a Lorentz force, which works as the actuator assembly-driving force. The distribution of the force applied to the movable coil becomes similar to that of the magnetic flux density of the magnetic field crossing the movable coil, and the sum of this force distribution becomes a driving force. The position of the center of the driving force is determined depending upon the distribution of the force applied to the movable coil. Accordingly, if the distribution of the intensity of a magnetic field generated by the magnetic circuit is varied with respect to the movable coil, the center of the driving force can be varied.

Figure 1:
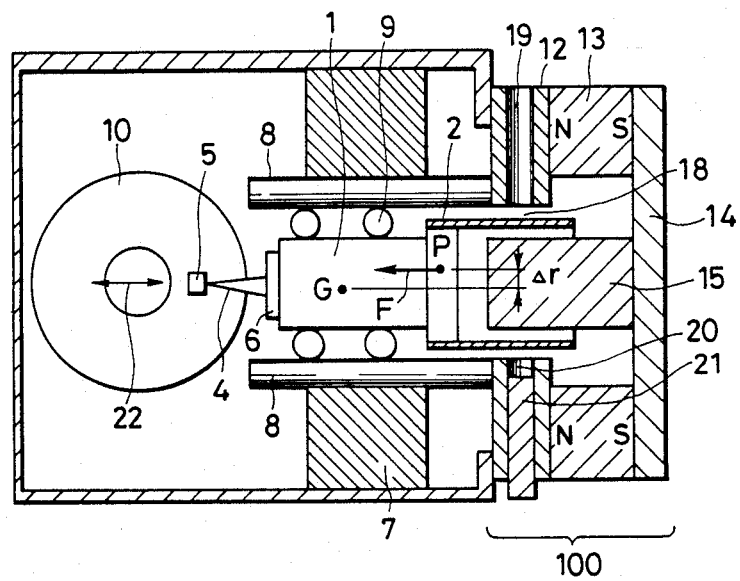
FIG. 1 is a schematic sectional view of an example of a magnetic divice including an actuator according to the present invention.
Figure 2:
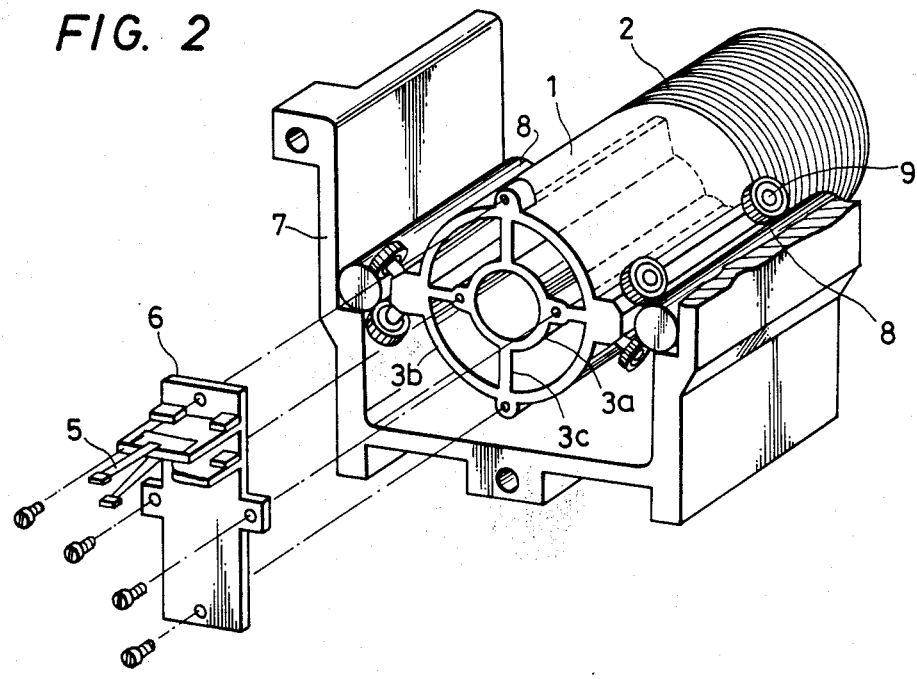
FIG. 2 is a perspective view of a linear actuator assembly supporting a magnetic head and guiding the same in the linear direction.

An embodiment of the present invention will now be described with reference to the drawings. FIG. 1 is a schematic top plan view of a magnetic disc device to which the present invention is applied. Referring to the drawing, a magnetic head 5 opposed to a rotating magnetic disc 10 is supported on a head retainer 6 via a load arm 4. The head retainer 6 is fixed to a carriage 1. The carriage 1 is provided at the other end thereof with a driving movable coil 2 having the structure as shown in FIG. 2 with connected portions 3a, 3b, 3c. These parts constitute an actuator assembly. The movable coil 2 is inserted into a magnetic gap 18 in a magnetic circuit 100, and an electric current is applied thereto. As a result, the movable coil 2 electromagnetically interferes with a magnetic field in the magnetic gap 18 to generate a Lorentz force. The sum of the Lorentz force occurring in each part of the coil works as an actuatordriving force F, whereby the actuator assembly is driven to a predetermined position in the direction 22 to set the magnetic head 5 in a predetermined position on the magnetic disc 10. During this time, the guiding and supporting of the actuator assembly are done by bearings 9 provided on the carriage 1, and guide rails 8 provided in a housing 7.

The construction of the actuator assembly is shown in FIG. 2. The actuator assembly as a whole is formed to a cylindrical body which is substantially symmetric around the axis thereof. Accordingly, the position of the center of gravity G of the actuator assembly is substantially aligned with the axis of the carriage 1. A detailed explanation about the actuator will now be given. The actuator assembly consists roughly of a carriage 1 capable of being moved to and fro linearly and provided at both ends thereof in the moving direction thereof with a plurality of bearings 9, at the front end thereof with a magnetic head—via a head retainer 6, and at the rear end thereof with a coil 2; two guide rails 8 containing the bearings 9 in the carriage 1 and thereby guiding the carriage 2 linearly; and a housing 7 holding these guide rails 8. This actuator assembly enables, as mentioned above, the carriage 1 to be moved linearly along the guide rails 8 by the Lorentz force occurring in the coil 2.

Figure 3:
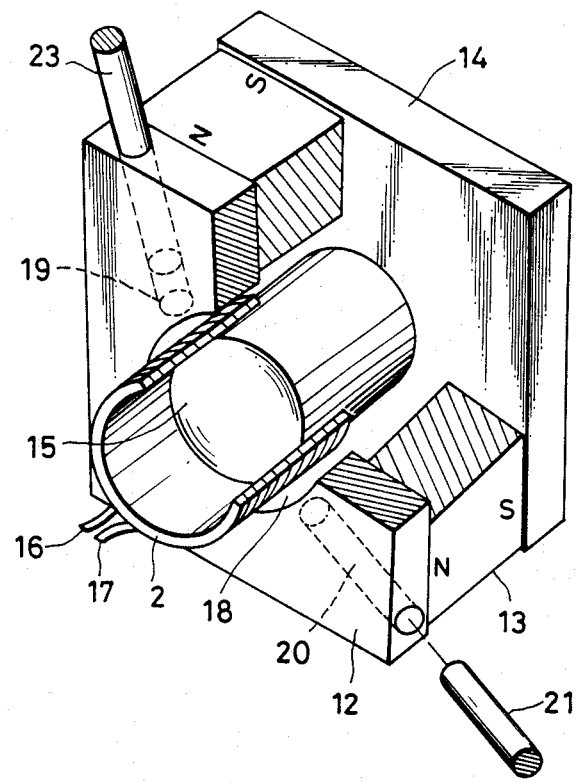
FIG. 3 is a perspective view of a magnetic circuit portion of the magnetic disc device of FIG. 1.

FIG. 3 is a detail view of the magnetic circuit 100 at the right end portion of FIG. 1. This magnetic circuit consists of ferromagnetic members 12, 14, 15, and a magnet 13. The movable coil 2 is inserted into a magnetic gap 18 formed in the magnetic circuit. The movable coil is turned on when a potential difference is applied to terminals 16, 17, to generate a Lorentz force in the direction 22 shown in FIG. 1.

The magnetic flux density distribution regulating means in this embodiment consists of the through bores 19, 20 provided in the ferromagnetic member 12, and rod members 21, 23 of a ferromagnetic material, which are shown in FIGS. 1 or 3. The through bores 19, 20 extend from the outer portion of the magnetic circuit 100 to the magnetic gap 18. After the magnetic disc device has been assembled, the rod member 21 or 23 can be inserted thereinto to an arbitrary depth. This structure enables the magnetic flux density distribution in the magnetic gap 18 to become uneven in the perpendicular direction with respect to the movable coil driving direction 22, i.e., in the circumferential direction. For example, in the case where the rod member 23 of a ferromagnetic material is inserted into the through bore 19 as shown in FIG. 3, the magnetic flux density in the portion of the gap 18 which is in the vicinity of the through bore 19 becomes higher than that in the portion of the gap 18 which is in the vicinity of the through bore 20 into which no rod member is inserted. The difference between these magnetic flux densities is determined depending upon the depth to which the rod member 23 is inserted into the through bore 19. Accordingly, this method enables the magnetic flux density distribution in the magnetic gap 18 to be varied arbitrarily from the outside of the magnetic circuit.

As previously mentioned, the center of gravity G of the actuator assembly is substantially aligned with the axis of the carriage 1, and the Lorentz force is applied uniformly to the circumferential portion of the movable coil 2 since the movable coil 2 and magnetic gap 18 are made cylindrical so as to have a common axis. Accordingly, the driving force F consisting of the sum of the Lorentz force is also applied to the point P which is substantially aligned with the axis of the carriage 2. During this time, a deviation $\Delta r$ occurs between the center of gravity G of the actuator and the point P to which the driving force F is applied, due to the influence of the assembling tolerance of the actuator assembly and the frictional force of the bearings 9. The product of the deviation $\Delta r$ and driving force F works as the torque for turning the actuator assembly around the center of gravity G, this torque causing vibrations to occur in the actuator assembly. Such vibrations remain and continue even after the positioning of the head 5 has been done, so that the positioning accuracy decreases. When the driving force F is periodically applied to the actuator, a support structure consisting of the housing 7 and guide rails 8 resonates therewith to cause the positioning accuracy to abnormally lower.

In order to prevent the decrease in the positioning accuracy in this embodiment, the rod member 21 of ferromagnetic material is inserted to a suitable depth into the through bore 20 shown in FIG. 1, so as to minimize the deviation $\Delta r$ between the center of gravity G and the point P to which the driving force is applied. The more deeply the rod member 21 is inserted into the bore 20, the more the magnetic flux density at the lower side (in the vicinity of the inner end of the through bore 20) of the magnetic gap increases, the magnetic flux working on the movable coil 2. Since the driving force in the vicinity of the mentioned position increases, the point P on which the driving force works deviates downward, so that the deviation $\Delta r$ decreases.

The position signal recorded on the magnetic disc 10 is then reproduced, and the waveform thereof is observed as the signal is demodulated, to discover that the smaller the deviation $\Delta r$ becomes, the smaller the amplitude of the waveform of the signal becomes, and that, when $\Delta r \approx 0$, the amplitude becomes minimal. This shows that the actual depth to which the rod member 21 is inserted into the through bore 20 is optimum. In a linearly-moving actuator assembly, the vibrations of the actuator being driven can be minimized by the method used in this embodiment, whereby the positioning accuracy can be improved.

In the above-described embodiment, the intensity distribution of the magnetic field is varied by utilizing the through bore provided in the ferromagnetic member. The deviation $\Delta r$ can also be minimized by varying the relative positions of the magnetic circuit and movable coil. This method can also be used effectively in a rotary actuator.

Figure 4:
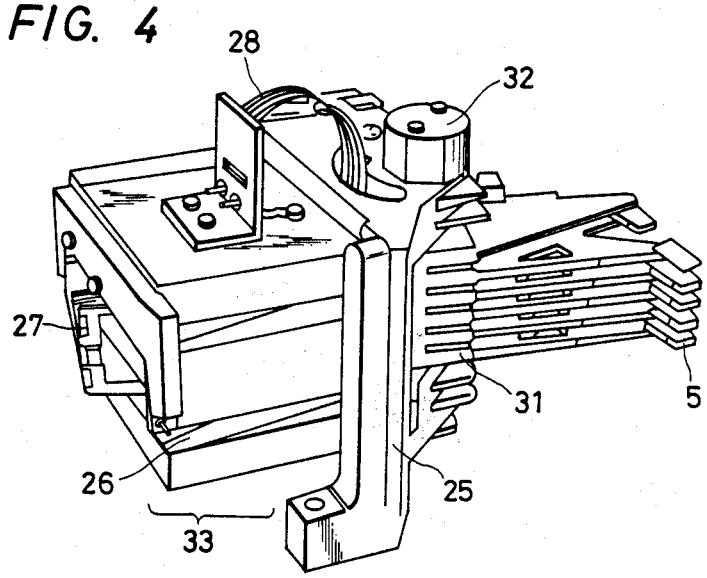
FIG. 4 is a perspective view of a rotary actuator supporting a magnetic head and moving the same circularly.

FIG. 4 shows an example of a rotary actuator, in which a carriage 31 is turned around a rotary shaft 32 by the driving force generated by a movable coil 27 having lead wire 28, to move a magnetic head 5. The movable coil 27 is inserted in a magnetic gap in a magnetic circuit 33 to form a voice coil motor.

Figure 5:
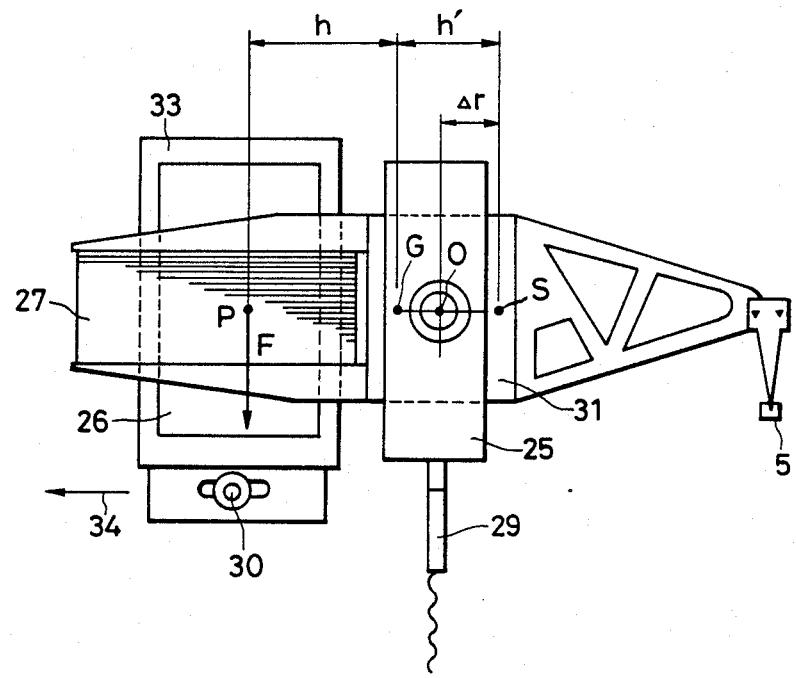
FIG. 5 illustrates an embodiment of a rotary actuator according to the present invention.

FIG. 5 is a top plan view of an example of the rotary actuator to which the embodiment of the present invention is applied. The driving force F works on the center P of the driving force applied to a movable coil 27, to turn the actuator assembly around the center 0 of rotation. The distance h' between the shock center S and the center of gravity G of the actuator assembly is expressed by the following equation.

$$h' = IG/mh \tag{1}$$

wherein IG is the inertial moment around the center of gravity G; m the mass of a movable portion; and h the distance between the center of gravity G and the center P of the driving force.

If the shock center S is aligned with the center 0 of rotation, only the rotational force is applied to the actuator assembly, and the driving reaction force is not to the rotary shaft 32. However, when the shock center S deivates from the center 0 of rotation by $\Delta r$ as shown in FIG. 5, the driving reaction force proportional to the deviation $\Delta r$ and driving force F occurs in the actuator assembly, so that the actuator assembly vibrates the housing 25.

If the magnetic circuit 33 is then moved in the direction 34 as the vibrations of the housing 25 during the driving operation of the actuator is detected by a detector 29, the position of the magnet 26 moves relatively to the movable coil 27, so that the distribution of the magnetic flux crossing the movable coil 27 moves in the direction 34. Accordingly, the center P of the driving force also moves, and, consequently, h' varies in accordance with the equation (1) to cause $\Delta r$ to decrease to a low level. When the deviation $\Delta r$ has become zero, the vibrations of the housing become minimal. The magnetic circuit 33 is then fixed to the base with a screw 30, so that the magnetic circuit 33 and movable coil 27 have optimum positional relation with respect to the occurrence of vibrations.

According to this embodiment, a vibration phenomenon can be finely adjusted as the vibration phenomenon is generated by the practical actuator assembly and driving method therefor, so as to minimize the vibrations. Namely, the vibrations of the housing, which are ascribed to the uncertain factors, such as the assembling tolerance, which differs in different devices, can be minimized.

According to the present invention, the vibrations of the housing due to the actuator driving reaction force can be minimized, and a high-speed, highly-accurate actuator assembly for magnetic disc devices can be obtained.

We claim:

1. An actuator for memory devices, which is adapted to move a magnetic head above a recording medium, comprising: an actuator assembly supporting said magnetic head to guide the same so that said magnetic head can be moved reciprocatingly along a fixed path;
   driving means for applying a driving force to said actuator assembly;
   said actuator assembly having guide rails along which said magnetic head is guided linearly;
   said driving means having a magnetic circuit including a first magnet and forming a magnetic gap;
   a coil combined with said actuator assembly and inserted into said magnetic gap in said magnetic circuit so that an electric current being applied to said coil will move said actuator assembly linearly and reciprocatingly; and
   regulating structure in said driving means to regulate the position at which the driving force applied to said actuator assembly works, by varying the distribution of the magnetic flux density of a magnetic field applied from said magnetic circuit to said coil, thereby aligning the center of gravity of the actuator assembly with the center of the driving force of the driving means.

2. An actuator for memory devices according to claim 1, wherein said regulating structure is adapted to regulate the position on which the driving force applied to said actuator assembly works, by varying the position of a movable ferromagnetic member provided in said magnetic circuit.

3. An actuator for memory devices according to claim 2, wherein said magnetic head is capable of reading signals from the data track on said recording medium, said member in said regulating structure in said driving means being fixed to a position in which the vibrations of a 4. An actuator for memory devices, which is adapted to move a magntic head above a recording medium, comprising: an actuator assembly supporting said magnetic head to guide the same so that said magnetic head can be moved rotationally along a fixed path;
   driving means for applying a driving force to said actuator assembly said actuator assembly having a center of rotation around which said head is moved arcuately and reciprocatingly, said driving means having a magnetic circuit including a magnet and forming a magnetic gap, and a coil combined with said actuator assembly and inserted into the gap in said magnetic circuit, so that an electric current being applied to said coil will move said actuator assembly arcuately and reciprocatingly;
   regulating structure in said driving means to regulate the position at which the driving force applied to said actuator assembly works by varying the distribution of the magnetic flux density of a magnetic field applied from said magnetic circuit to said coil thereby aligning the shock center of the actuator assembly with the center of rotation of the actuator assembly.

5. An actuator for memory devices according to claim 4, wherein said regulating structure is adapted to regulate the position on which the driving force applied to said actuator assembly works, by varying the distance between the center of rotation of said actuator assembly and said magnetic circuit.

6. An actuator for memory devices, which is adapted to move a magnetic head across the tracks on a magnetic disc and thereby position said magnetic head above an object track, comprising;
- an actuator assembly which supports said magnetic head and is adapted to guide said magnetic head so that said magnetic head can be moved reciprocatingly along a fixed path including a carriage supporting said magnetic head on one end portion thereof, a plurality of guide rails adapted to guide said magnetic head in the radial direction of said magnetic disc, and a plurality of bearings for retaining said carriage on said guide rails so that said carriage moves along said guide rails; and
- a voice coil motor adapted to apply a driving force to said actuator assembly and having a coil fixed to the other end portion of said carriage, and a magnetic circuit which includes a magnetic gap in which said coil is inserted, and a regulating structure which is adapted to generate by a first magnet a magnetic field crossing said coil and regulate the magnetic flux distribution of said magnetic field thereby aligning the center of gravity of the actuator assembly with the center of the driving force of the driving means.

7. An actuator for memory devices according to claim 6, wherein said regulating structure in said voice coil motor includes a ferromagnetic member capable of varying the distance between said member and said gap.

8. An actuator for memory devices, which is adapted to move a magnetic head across the tracks on a magnetic disc and thereby position said magnetic head above an object track, comprising:
- an actuator assembly which supports said magnetic head so that said magnetic head can be moved substantially in the radial direction of said magnetic disc, and which has a carriage retaining said magnetic head on one end portion therof, rotary shaft supporting said carriage so that said carriage can be turned, and a housing to which said rotary shaft is fixed; and
- a voice coil motor adapted to apply a driving force to said actuator assembly and having a coil fixed to the other end portion of said carriage, and a magnetic circuit which includes a magnetic gap in which said coil is inserted, and a regulating structure which is adapted to generate a magnetic field crossing said coil and regulate the magnetic flux distribution of said magnetic field thereby aligning the shock center of the actuator assembly with the center of rotation of the actuator assembly 9. An actuator for memory devices according to claim 8, wherein said regulating structure in said voice coil motor is capable of regulating the distance between said magnetic circuit and said rotary shaft.

* * * * *